(12) United States Patent
Huebl et al.

(10) Patent No.: US 11,430,590 B2
(45) Date of Patent: Aug. 30, 2022

(54) EMISSION PROTECTION DEVICE AND METHOD FOR OPERATING A LOAD

(71) Applicant: Robert Bosch GmbH, Stuttgart (DE)

(72) Inventors: Jochen Huebl, Schwieberdingen (DE); Peter Kralicek, Marbach (DE); Michael Kubach, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/610,727

(22) PCT Filed: Mar. 22, 2018

(86) PCT No.: PCT/EP2018/057315
§ 371 (c)(1),
(2) Date: Nov. 4, 2019

(87) PCT Pub. No.: WO2018/215119
PCT Pub. Date: Nov. 29, 2018

(65) Prior Publication Data
US 2020/0168382 A1 May 28, 2020

(30) Foreign Application Priority Data
May 23, 2017 (DE) .......................... 102017208682.3

(51) Int. Cl.
*B60L 1/00* (2006.01)
*B60L 3/00* (2019.01)
(Continued)

(52) U.S. Cl.
CPC ............. *H01F 7/064* (2013.01); *B60R 16/02* (2013.01)

(58) Field of Classification Search
CPC ......... H01F 7/064; B60R 16/02; H04B 15/02; H04B 2215/00
(Continued)

(56) References Cited

U.S. PATENT DOCUMENTS 4,713,631 A * 12/1987 Enderby ................. H03L 7/187
331/177 V
2012/0098591 A1 4/2012 Subramanian et al.
(Continued)

FOREIGN PATENT DOCUMENTS

CN 106716821 A 5/2017
DE 19940284 C1 9/2000
(Continued)

OTHER PUBLICATIONS

International Search Report for PCT/EP2018/057315, dated Jun. 18, 2018.

*Primary Examiner* — Richard Tan
(74) *Attorney, Agent, or Firm* — Norton Rose Fulbright US LLP; Gerard Messina

(57) ABSTRACT

An emission protection device including a signal generating unit to generate, for at least one electrical signal relayed by at least one conductor to a load, with which the load is switchable and/or energize-able, at least one electrical output signal, which is phase-shifted by 180° compared to the at least one electrical signal, and an emitting structure, which is connected to the signal generating unit so that the emitting structure is excitable with the at least one electrical output signal to emit an electromagnetic field. Also described is a bridge driver for a load, a controller for a load, and a load, as well as a method for operating a load by switching and/or energizing the load with the at least one electrical signal, generating the at least one electrical output signal, and exciting the emitting structure using the at least one electrical output signal to emit an electromagnetic field.

14 Claims, 4 Drawing Sheets

(51) Int. Cl.
*H02G 3/00* (2006.01)
*H01F 7/06* (2006.01)
*B60R 16/02* (2006.01)

(58) Field of Classification Search
USPC .......................................................... 307/9.1
See application file for complete search history.

(56) References Cited

U.S. PATENT DOCUMENTS

2013/0081718 A1\* 4/2013 Ubidia .................. F04B 49/225
137/565.01
2016/0294216 A1 10/2016 Barbul et al.
2018/0138843 A1\* 5/2018 Schwarzkopf ..... G01R 19/2513

FOREIGN PATENT DOCUMENTS

| DE | 102011084942 A1 | | 4/2013 |
|----|----|----|----|
| DE | 102013225241 A1 | | 6/2015 |
| JP | H01231515 A | | 9/1989 |
| JP | H08186544 | \* | 7/1996 |
| JP | H08186544 A | | 7/1996 |
| JP | 2001144696 A | | 5/2001 |
| JP | 2003338722 A | | 11/2003 |
| JP | 2016514447 A | | 5/2016 |

\* cited by examiner

EMISSION PROTECTION DEVICE AND METHOD FOR OPERATING A LOAD

FIELD OF THE INVENTION

The present invention relates to an emission protection device. The present invention also relates to a bridge driver for a load, a controller for a load, and a load. Furthermore, the present invention relates to a method for operating a load.

BACKGROUND INFORMATION

FIGS. 1a through 1c show a schematic view of a conventional load and coordinate systems to explain a standard procedure for operating a load according to the related art.

Conventional load 10 schematically shown in FIG. 1a is operated with the aid of a controller 14 situated on a circuit board 12. For this purpose, load 10 is connected via three phase lines U, V, and W to controller 14. Electrical signals $S_u$, $S_v$, and $S_w$, which are relayed by phase lines U, V, and W to load 10 and with the aid of which load 10 is switched and/or energized, are shown in the coordinate system in FIG. 1b, an abscissa being a time axis t and an ordinate indicating a voltage U (in volts). (A signal amplitude of electrical signals $S_u$, $S_v$, and $S_w$ may be, for example, 12 V.)

The activation, switching, and/or energizing of load 10 using electrical signals $S_u$, $S_v$, and $S_w$ generates an undesirable electromagnetic interference field, however. For example, at least one metallic surface of components 10 through 14 and/or phase lines U, V, and W may be excited to emit the electromagnetic interference field. (This circumstance is known to the applicant as internal related art.) As schematically shown in FIG. 1a, a receiving antenna 16 may be excited by the electromagnetic interference field undesirably triggered with the aid of the operation of load 10. In FIG. 1a, "coupling capacitances" $C_u$, $C_v$, and $C_w$ between phase lines U, V, and W and receiving antenna 16 illustrate their excitation. An interference signal $S_{mistake}$ received by receiving antenna 16 is shown in the coordinate system of FIG. 1c, its abscissa showing time axis t and its ordinate indicating a voltage U (in volts).

SUMMARY OF THE INVENTION

The present invention provides an emission protection device having the features described herein, a bridge driver for a load having the features described herein, a controller for a load having the features described herein, a load having the features described herein, and a method for operating a load having the features described herein.

The present invention provides options for generating an electromagnetic field, which, as a counter field to an electromagnetic interference field undesirably generated during the operation of a load, may at least partially reduce/eliminate the electromagnetic interference field. This may also be described as an at least partial compensation of the undesirably emitted electromagnetic interference field with the aid of the electromagnetic field effectuated according to the present invention as a counter field. Upon a use of the present invention, undesirable consequences of the electromagnetic interference field generated by operating a load, for example, a reception of an interference signal by a receiving antenna, therefore do not have to be accepted. The present invention therefore contributes to improved protection/emission protection from electromagnetic interference fields.

It is to be expressly noted that the present invention effectuates its advantageous protective effect/emission protection effect without a metallic shield/protective shield. Conventional disadvantages of a usage of a metallic shield/protective shield are thus dispensed with if the present invention is used. Moreover, the present invention may also implement the advantageous emission protection if comparatively large/large-area metallic surfaces are excited to emit the electromagnetic interference field with the aid of the at least one electrical signal used for activating, switching, and/or energizing the load. A necessity of reducing in size the at least one metallic surface emitting an interference field is thus dispensed with. Since the present invention also implements its advantages if comparatively many electrical signals and/or at least one electrical signal having a comparatively high signal amplitude are used for activating, switching, and/or energizing the load, a reduction of the motor activation is also not necessary if the present invention is used.

In one advantageous specific embodiment of the emission protection device, an electromagnetic interference field, emitted from at least one metallic surface of the load and/or an electronic component connected to the load or adjacent to the load due to an excitation of the at least one metallic surface with the aid of the at least one electrical signal, may be at least partially reduced or eliminated with the aid of the electromagnetic field emitted by the emitting structure. At least partial reduction of the undesirably emitted electromagnetic interference field with the aid of the electromagnetic field (as a counter field) may also be understood as at least partial elimination of the electromagnetic interference field or at least partial "negative interference" of the electromagnetic interference field. Consequences of the undesirably emitted electromagnetic interference field thus hardly have to be taken hardly into consideration or not at all.

In another advantageous specific embodiment of the emission protection device, the signal generating unit has one high-side MOSFET and one low-side MOSFET in each case for the at least one conductor, which are each connected to the associated conductor in such a way that the at least one electrical signal relayed by the at least one conductor to the load generates the at least one electrical output signal phase-shifted by 180° in relation thereto. A passive signal generation may thus also be used for effectuating the at least one output signal. Moreover, comparatively cost-effective components may be used for the passive signal generation. Further options for forming of the signal generating unit are forming it with only one MOSFET (high-side MOSFET/low-side MOSFET) with or without a freewheeling diode and with an active or passive freewheeling.

For example, the signal generating unit may also include a B6 bridge, to which three phase lines are each connected as the at least one conductor in such a way that the at least one electrical signal relayed by the three phase lines to the load generates the at least one electrical output signal phase-shifted by 180° in relation thereto. In addition to the advantage of a passive signal generation with the aid of at least one cost-effective component, in the specific embodiment of the emission protection device described here, the signal generating unit may also be configured having a comparatively small installation space requirement.

Alternatively, the signal generating unit may also include one MOSFET and one diode in each case for the at least one conductor, which are each connected to the associated conductor in such a way that the at least one electrical signal relayed by the at least one conductor to the load generates the at least one electrical output signal phase-shifted by 180° in relation thereto. This alternative specific embodiment of the emission protection device is also suitable for passive signal generation and may be configured relatively cost-effectively.

The above-described advantages are also effectuated in a bridge driver for a load or a controller for a load having such an emission protection device.

A load having a corresponding emission protection device also implements the above-explained advantages. The load may be, for example, a motor, a valve, a light-emitting unit, and/or an electronic device. It is also advantageous if the load is installable or installed on a vehicle. For example, the load may be an electrical brake booster motor, a pump motor, or a braking system valve. However, it is to be noted that the exemplary embodiments for the load listed here are only to be interpreted as examples.

Furthermore, carrying out a corresponding method for operating a load also yields the above-described advantages. It is also expressly noted that the method may also be refined according to the above-described specific embodiments of the emission protection device, the bridge driver for a load, the controller for a load, and/or the load.

Further features and advantages of the present invention are explained hereafter on the basis of the figures.

DETAILED DESCRIPTION

Figure 1A:
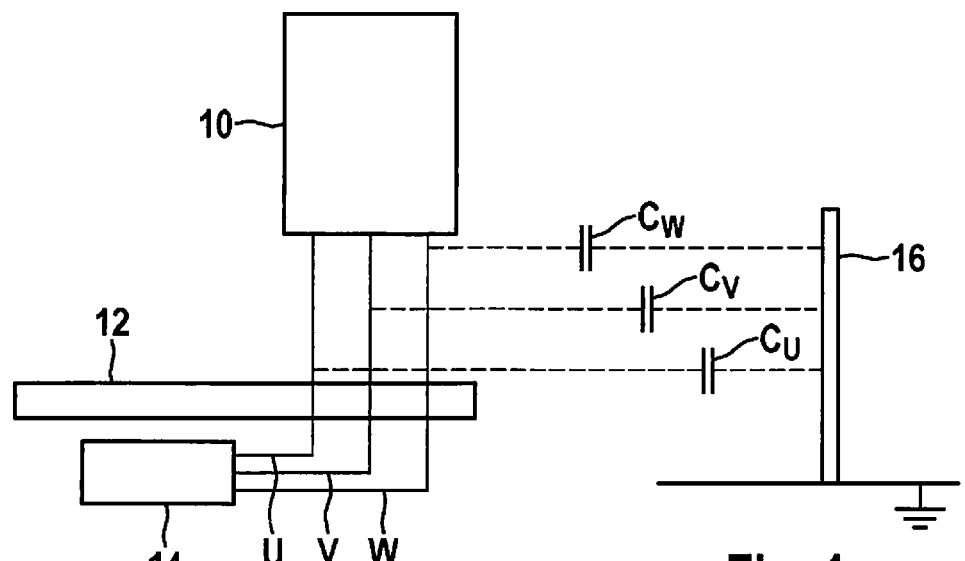
FIGS. 1a, 1b and 1c show a schematic view of a conventional load and coordinate systems for explaining a standard procedure for operating the load according to the related art.
Figure 1B:
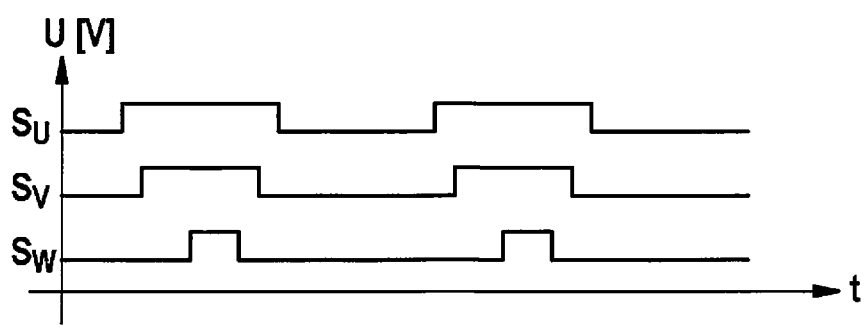
Figure 1C:
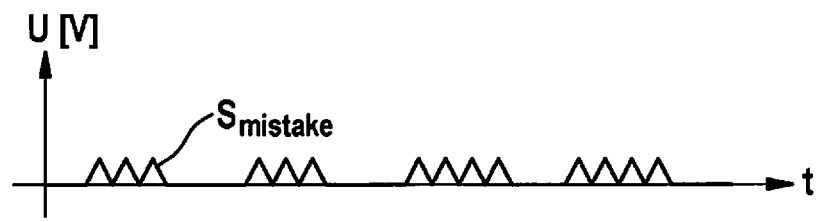
Figure 2:
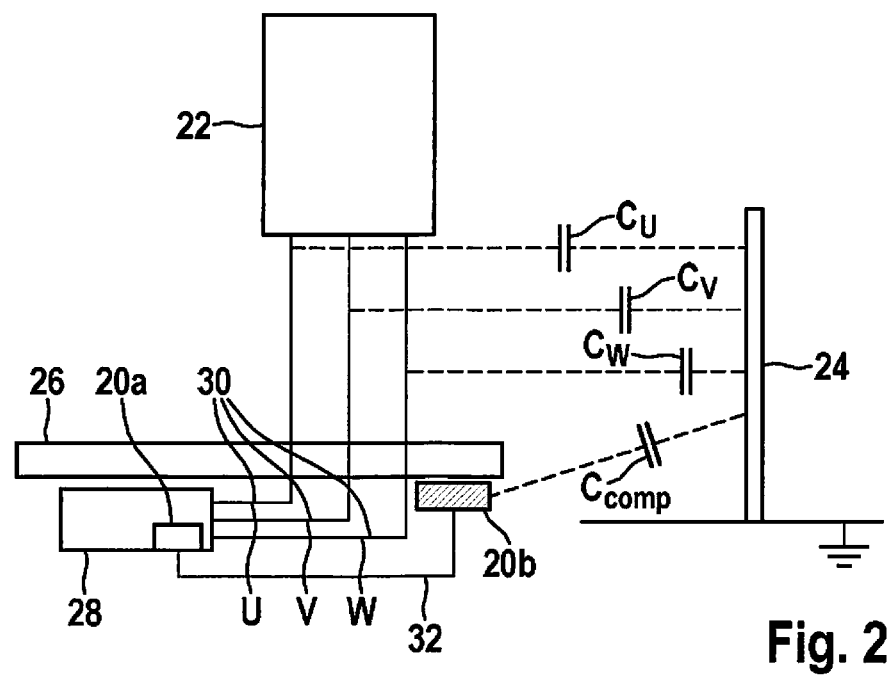
FIG. 2 shows a schematic view of a first specific embodiment of the emission protection device.

FIG. 2 shows a schematic view of a first specific embodiment of the emission protection device.

Emission protection device 20a and 20b, which is schematically shown in FIG. 2, is configured to interact with a motor 22 as a load 22. For example, motor 22 is a brushless DC motor 22 (BLDC), in particular a brushless three-phase motor 22, which is configured for a clocked motor activation. However, it is to be noted that a usability of emission protection device 20a and 20b explained hereafter is not limited to a configuration of load 22 as a motor 22. For example, emission protection device 20a and 20b may also be used for a load 22 which is a valve, a light-emitting unit (for example, a device having at least one light-emitting diode), and/or an electronic device, such as a domestic appliance, a material processing device (for example, an electrical saw), and/or a high-power device, in particular. Emission protection device 20a and 20b is thus versatile. Moreover, it is to be noted that the examples listed here for the configuration of load 22 are only to be interpreted as examples.

A use of emission protection device 20a and 20b for a load 22 installed on a vehicle/motor vehicle is advantageous in particular. In particular in the case of a use of load 22 on/in a vehicle/motor vehicle, it is frequently advantageous if at least one vehicle component 24 which reacts sensitively to an electromagnetic interference field, for example, a receiving antenna 24 shown in FIG. 2, may be used without disadvantage relatively close to load 22 as a result of the advantageous use of emission protection device 20a and 20b for at least partially eliminating the electromagnetic interference field. It is therefore advantageous if load 22 is, for example, an electrical brake booster motor, a pump motor, or a braking system valve. However, it is to be noted that a usability of emission protection device 20a and 20b is not restricted to load 22, which is installable/installed in/on a vehicle/motor vehicle.

In the example of FIG. 2, load 22 is operated by a controller 28 situated on a circuit board 26. Controller 28 may be a bridge driver 28, for example. For this purpose, load 22 is connected via at least one conductor 30, for example, at least one metallic conductor 30, to controller 28. Solely by way of example, load 22 of FIG. 2 is connected to controller 28 via three phase lines U, V, and W as the at least one conductor 30.

At least one electrical signal, with the aid of which load 22 is switchable/switched and/or may be energized/is energized, is relayed to load 22 by the at least one conductor 30.

The use of circuit board 26 is only to be interpreted as an example, however. As an alternative to circuit board 26, for example, a stamped grid or a similar component may also be used. An arrangement of controller 28 on such a component may also be omitted.

Emission protection device 20a and 20b includes a signal generating unit 20a, which is configured to generate at least one electrical signal, relayed by the at least one conductor 30 to load 22, with the aid of which load 22 is switched and/or energized and to generate at least one electrical output signal which is phase-shifted by 180° in comparison to the at least one electrical signal. The at least one output signal may also described as at least one compensation signal for the electrical signal relayed by the at least one conductor 30 to load 22. Signal generating unit 20a is configured to generate the at least one output signal/compensation signal in such a way that "adding" of the at least one electrical signal used for activating, switching, and/or energizing load 22 and the at least one output signal/compensation signal (which is phase-shifted by 180° in relation thereto) would effectuate at least a reduction/partial suppression of the at least one electrical signal. The at least one output signal/compensation signal may be generated/is generated with the aid of signal generating unit 20a in such a way that the "adding" of the at least one electrical signal used for activating, switching, and/or energizing load 22 and the at least one output signal/compensation signal (phase-shifted by 180° in relation thereto) would effectuate a "zero signal" (having a maximum signal amplitude of almost zero). The at least one output signal/compensation signal may thus have an output signal amplitude equal to a signal amplitude of the associated at least one electrical signal (in relation to which it is phase-shifted by 180°). The "adding" of the at least one electrical signal used for activating, switching, and/or energizing load 22 and the at least one output signal/compensation signal (phase-shifted by 180° in relation thereto) would in this case effectuate "elimination" or "complete compensation" of the at least one electrical signal.

Moreover, emission protection device 20a and 20b includes an emitting structure 20b, which is connected to signal generating unit 20a in such a way that emitting structure 20b is excitable with the aid of the at least one electrical output signal to emit an electromagnetic field. Signal generating unit 20a may be connected to emitting structure 20b in such a way that the at least one electrical output signal, which is phase-shifted in comparison to the at least one electrical signal by 180°, may be provided/output at emitting structure 20b.

FIG. 2 also schematically reflects, with the aid of "coupling capacitances" $C_u$, $C_v$, and $C_w$, an electromagnetic interference field emitted by at least one metallic surface due to an excitation of the at least one surface with the aid of the at least one electrical signal. The at least one metallic surface emitting the electromagnetic interference field may be located at load 22 and/or at an electronic component 26 through 30, which is connected to load 22 or adjacent to load 22 (for example, circuit board 26, controller 28, and/or the at least one metallic conductor 30). The electromagnetic field emitted by emitting structure 20b is also schematically shown with the aid of "compensation coupling capacitances" $C_{comp}$. The electromagnetic interference field may be at least partially reduced with the aid of the electromagnetic field emitted by emitting structure 20b. Interfering emission may thus be reduced cost-effectively and reliably with the aid of emission protection device 20a and 20b. The electromagnetic interference field may be (nearly) eliminated with the aid of the electromagnetic field emitted by emitting structure 20b. The electromagnetic field emitted by emitting structure 20b is generally phase-shifted by 180° in relation to the electromagnetic interference field and thus acts as a counter field to the electromagnetic interference field. In particular, a compensation intensity of the electromagnetic field emitted by emitting structure 20b may be (nearly) equal to an intensity of the electromagnetic interference field. This causes a reliable prevention of conventional interference effects of the electromagnetic interference field.

In the example of FIG. 2, signal generating unit 20a is integrated into controller 28, while emitting structure 20b is directly formed on circuit board 26 by way of example, signal generating unit 20a being connected via an output signal conductor 32 to emitting structure 20b. The separate formation of signal generating unit 20a and emitting structure 20b shown in FIG. 2 is only to be interpreted as an example, however.

The at least one output signal/compensation signal may be generated phase-shifted by 180° in comparison to the at least one electrical signal by at least one passive component of signal generating unit 20a and/or at least one active component of signal generating unit 20a. Advantageous options for the configuration of signal generating unit 20a are described hereafter.

A simple metallic surface may be used as emitting structure 20b, for example. A differently configured structure made of at least one electrically conductive material may also be used for emitting structure 20b. For example, an (already provided) cooling device may be used as emitting structure 20b. A formation of emitting structure 20b as a transmitting antenna is thus possible, but is not necessary.

Figure 3:
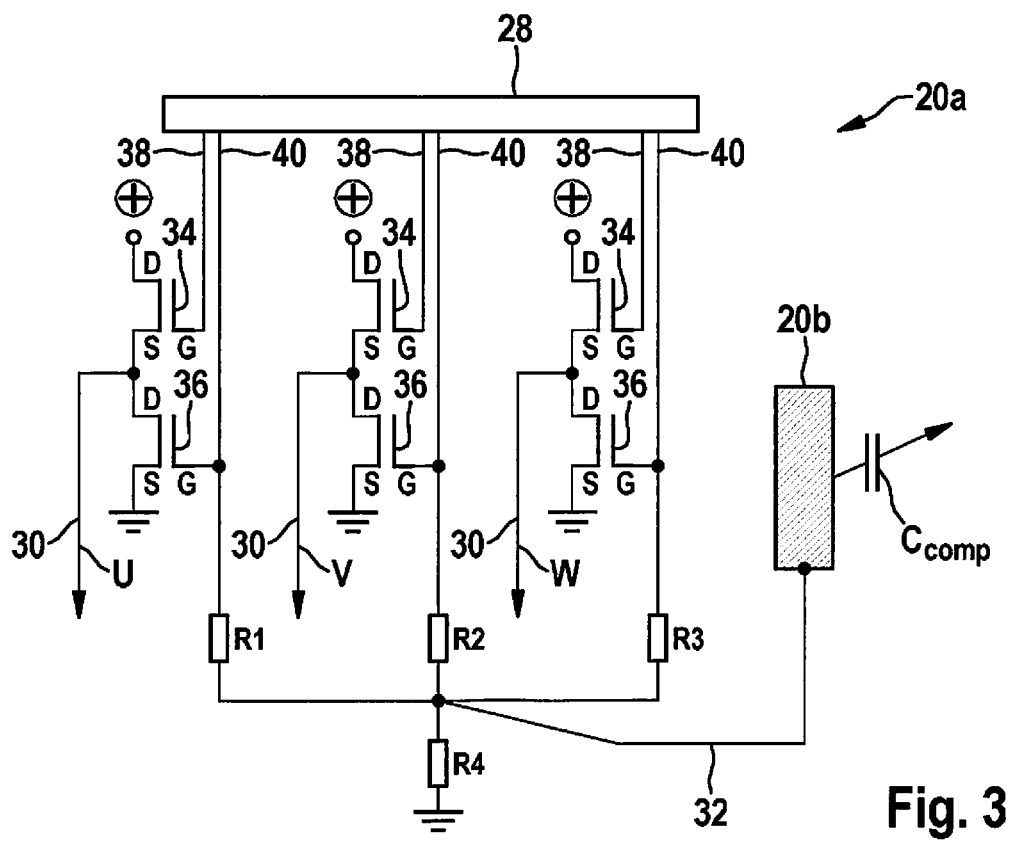
FIG. 3 shows a schematic partial view of a second specific embodiment of the emission protection device.

FIG. 3 shows a schematic partial view of a second specific embodiment of the emission protection device.

In emission protection device 20a and 20b partially schematically shown in FIG. 3, signal generating unit 20a includes a high-side MOSFET 34 and a low-side MOSFET 36 in each case for the at least one conductor 30. MOSFETs 34 and 36 of signal generating unit 20a are each connected to associated conductor 30 in such a way that the at least one electrical signal relayed by the at least one conductor 30 to load 22 (not shown) (automatically) (co-)generates the at least one electrical output signal phase-shifted by 180° in relation thereto. High-side activation signals are output at gates G of high-side MOSFETs 34 via lines 38. Accordingly, low-side activation signals are output at gates G of low-side MOSFETs 36 via lines 40. The electrical signals may be tapped between a source S of a high-side MOSFET 34 and a drain D of an adjacent low-side MOSFET 36.

Signal generating unit 20a of FIG. 3 is configured for "passive signal generation". The fact is utilized for this purpose that the low-side activation signal of particular low-side MOSFET 36 is automatically phase-shifted by 180° in relation to the particular electrical signal. The electrical output signals are "added" to form an overall output signal via a node point between resistors R1 through R3 and a further resistor R4, "scaled", and relayed to emitting structure 20b.

High-side MOSFETs 34 and low-side MOSFETs 36 may be formed, for example, as a B6 bridge. In this case, the three phase lines U, V, and W (as the at least one conductor 30) are each connected to the B6 bridge in such way that the at least one electrical signal relayed by the three phase lines U, V, and W to load 22 generates the at least one electrical output signal phase-shifted by 180° in relation thereto.

Figure 4A:
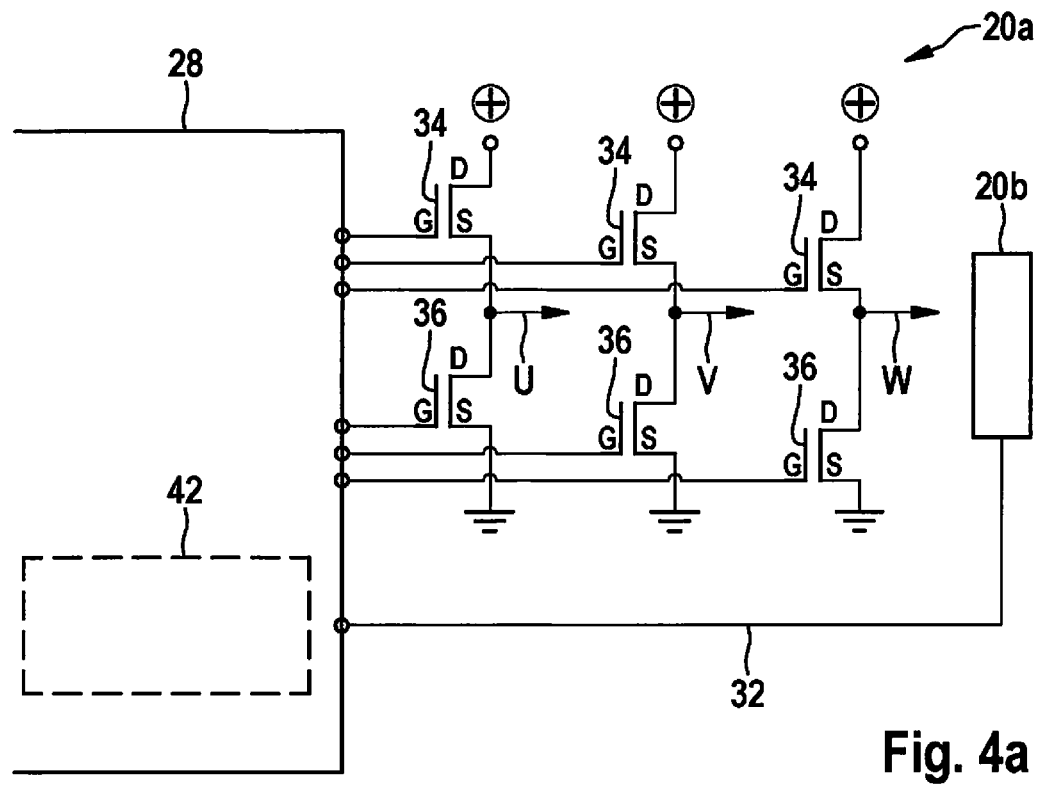
FIGS. 4a and 4b show schematic partial views of a third specific embodiment of the emission protection device.
Figure 4B:
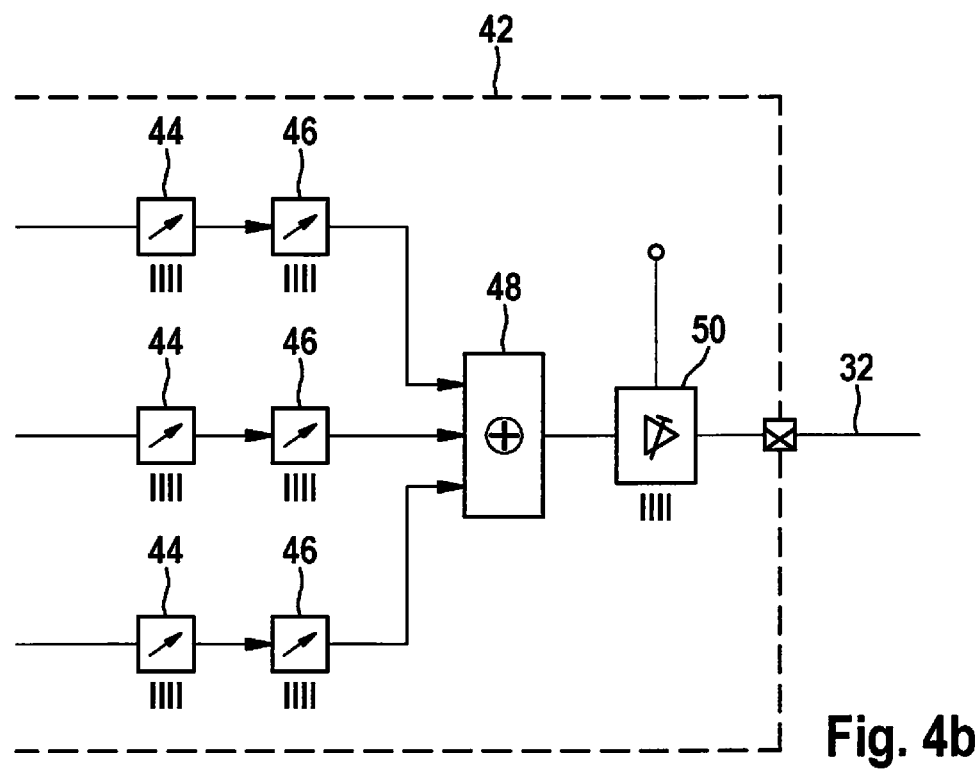

FIGS. 4a and 4b show schematic partial views of a third specific embodiment of the emission protection device.

Signal generating unit 20a shown in FIG. 4a includes an electronics unit 42 (in addition to a high-side driver (not shown) and a low-side driver (not shown)) integrated into controller 28, which is formed as a bridge driver 28. The block diagram shown in FIG. 4b shows integrated electronics unit 42. The logic signals of the low-side U phase, the low-side V phase, and the low-side W phase are provided at components 44 for delay setting, components 46 for rise/fall time setting, an adder 48, and a signal strength transformer 50 for amplifying/attenuating (having a supply voltage of, for example, 12 V, 24 V, or 48 V), whereby the overall output signal is obtained. Parameters of the B6 bridge or integrated electronics unit 42 may be set via a communication bus in such a way that they are adapted to the present application and effectuate at least partial reduction of the electromagnetic interference field (possibly complete elimination/cancellation of the electromagnetic interference field).

In an alternative specific embodiment of emission protection device 20a and 20b, signal generating unit 20a includes a high-side MOSFET 34 and a diode in each case for the at least one conductor 30, which are each connected to associated conductor 30 in such a way that the at least one electrical signal relayed by the at least one conductor 30 to load 22 generates the at least one electrical output signal phase-shifted by 180° in relation thereto. Instead of the at least one low-side MOSFET 36, the at least one diode may thus also be used. Further possible configurations of the signal generating unit are that they are formed having only one MOSFET (high-side MOSFET/low-side MOSFET) with or without a freewheeling diode and having an active or passive freewheeling.

Above-described emission protection devices 20a and 20b may also each be understood as an emission reduction device. The above-described advantages of emission protection device 20a and 20b are also ensured in the case of a controller 28 formed therewith (for example, a bridge driver 28) and in the case of a load 22 equipped therewith. Advantageous examples of load 22 have already been listed above.

Figure 5:
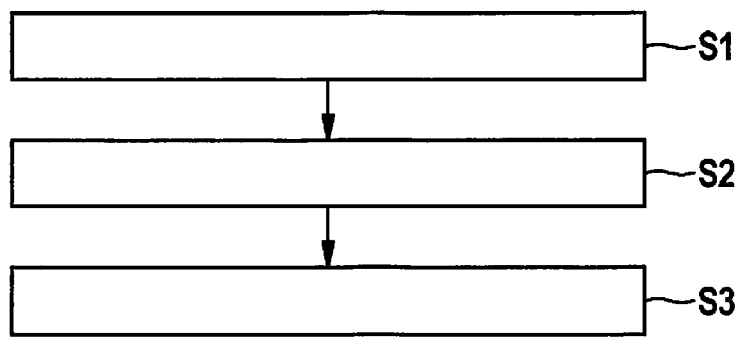
FIG. 5 shows a flow chart to explain one specific embodiment of the method for operating a load.

FIG. 5 shows a flow chart to explain one specific embodiment of the method for operating a load.

In a method step S1, the load is switched and/or energized with the aid of at least one electrical signal relayed by at least one conductor to the load. Method step S1 may be repeated as often as desired during the operation of the load.

Method steps S2 and S3 are also always carried out with method step S1. In method step S2, at least one electrical output signal is generated, which is phase-shifted by 180° in comparison to the at least one electrical signal. The at least one electrical output signal may be generated having an output signal amplitude equal to a signal amplitude of the associated at least one electrical signal (and a corresponding "scaling").

In method step S3, an emitting structure is excited using the at least one electrical output signal to emit an electromagnetic field. If motor phases are relayed with the aid of the at least one electrical signal in method step S1, the sensor structure is excited/activated inverted in relation to the motor phases.

It is taken into consideration by the execution of method steps S2 and S3 that due to the execution of method step S1, in general an electromagnetic interference field is emitted by at least one metallic surface of the load and/or an electronic component connected to the load or adjacent to the load (due to an excitation of the at least one metallic surface with the aid of the at least one electrical signal). However, the electromagnetic interference field is at least partially reduced or eliminated with the aid of the electromagnetic field emitted by the emitting structure by carrying out method steps S2 and S3.

The above-described method may be applied well to remedy emission problems (in particular in a lower frequency range). Advantageous examples of the load which are suitable for the execution of the method have already been listed above.

In method step S3, the emitting structure may be excited to emit the electromagnetic field using a compensation intensity equal to an intensity of the electromagnetic interference field. This effectuates complete elimination of the electromagnetic interference field.

What is claimed is:

1. An emission protection device, comprising:
   a signal generating unit to generate, for at least one electrical signal relayed by at least one conductor to a load, with which the load is switchable and/or energize-able, at least one electrical output signal, which is phase-shifted by 180° in comparison to the at least one electrical signal; and
   an emitting structure, connected to the signal generating unit so that the emitting structure is excitable with the at least one electrical output signal to emit an electromagnetic field, wherein the signal generating unit includes a high-side metal-oxide-semiconductor field-effect-transistor (MOSFET) and a low-side MOSFET in each case for the at least one conductor, which are each connected to the at least one conductor so that the at least one electrical signal relayed by the at least one conductor to the load generates the at least one electrical output signal phase-shifted by 180° in relation thereto, and wherein, in order to generate the at least one electrical output signal, a low-side activation signal of the low-side MOSFET is phase-shifted by 180° in relation to the at least one electrical signal.

2. The emission protection device of claim 1, wherein an electromagnetic interference field, which is emitted by at least one metallic surface of the load and/or an electronic component connected to the load or adjacent to the load, due to an excitation of the at least one metallic surface with the at least one electrical signal, is at least partially reduced or eliminated with the electromagnetic field emitted by the emitting structure.

3. The emission protection device of claim 1, wherein the signal generating unit includes a B6 bridge, to which three phase lines are each connected as the at least one conductor so that the at least one electrical signal relayed by the three phase lines to the load generates the at least one electrical output signal phase-shifted by 180° in relation thereto.

4. The emission protection device of claim 1, wherein the signal generating unit includes the high-side MOSFET and a diode in each case for the at least one conductor, which are each connected to the at least one conductor so that the at least one electrical signal relayed by the at least one conductor to the load generates the at least one electrical output signal phase-shifted by 180° in relation thereto.

5. A bridge driver for a load, comprising:
   an emission protection device, including;
   a signal generating unit to generate, for at least one electrical signal relayed by at least one conductor to the load, with which the load is switchable and/or energize-able, at least one electrical output signal, which is phase-shifted by 180° in comparison to the at least one electrical signal; and
   an emitting structure, connected to the signal generating unit so that the emitting structure is excitable with the at least one electrical output signal to emit an electromagnetic field, wherein the signal generating unit includes a high-side metal-oxide-semiconductor field-effect-transistor (MOSFET) and a low-side MOSFET in each case for the at least one conductor, which are each connected to the at least one conductor so that the at least one electrical signal relayed by the at least one conductor to the load generates the at least one electrical output signal phase-shifted by 180° in relation thereto, and wherein, in order to generate the at least one electrical output signal, a low-side activation signal of the low-side MOSFET is phase-shifted by 180° in relation to the at least one electrical signal.

6. A controller for a load, comprising:
   an emission protection device, including:
   a signal generating unit to generate, for at least one electrical signal relayed by at least one conductor to the load, with which the load is switchable and/or energize-able, at least one electrical output signal, which is phase-shifted by 180° in comparison to the at least one electrical signal; and
   an emitting structure, connected to the signal generating unit so that the emitting structure is excitable with the at least one electrical output signal to emit an electromagnetic field, wherein the signal generating unit includes a high-side metal-oxide-semiconductor field-effect-transistor (MOSFET) and a low-side MOSFET in each case for the at least one conductor, which are each connected to the at least one conductor so that the at least one electrical signal relayed by the at least one conductor to the load generates the at least one electrical output signal phase-shifted by 180° in relation thereto, and wherein, in order to generate the at least one electrical output signal, a low-side activation signal of the low-side MOSFET is phase-shifted by 180° in relation to the at least one electrical signal.

7. A load device, comprising:
   an emission protection device, including;
   a signal generating unit to generate, for at least one electrical signal relayed by at least one conductor to a load, with which the load is switchable and/or energize-able, at least one electrical output signal, which is phase-shifted by 180° in comparison to the at least one electrical signal; and an emitting structure, connected to the signal generating unit so that the emitting structure is excitable with the at least one electrical output signal to emit an electromagnetic field, wherein the signal generating unit includes a high-side metal-oxide-semiconductor field-effect-transistor (MOSFET) and a low-side MOSFET in each case for the at least one conductor, which are each connected to the at least one conductor so that the at least one electrical signal relayed by the at least one conductor to the load generates the at least one electrical output signal phase-shifted by 180° in relation thereto, and wherein, in order to generate the at least one electrical output signal, a low-side activation signal of the low-side MOSFET is phase-shifted by 180° in relation to the at least one electrical signal.

8. The load of claim 7, wherein the load is a motor, a valve, a light-emitting unit, and/or an electronic device.

9. The load of claim 7, wherein the load is installable or installed on a vehicle.

10. The load of claim 8, wherein the load is an electrical brake booster motor, a pump motor, or braking system valve.

11. A method for operating a load including the following steps:
switching and/or energizing the load with at least one electrical signal relayed by at least one conductor to the load;
generating at least one electrical output signal, which is phase-shifted by 180° in comparison to the at least one electrical signal; and
exciting an emitting structure using the at least one electrical output signal to emit an electromagnetic field, wherein the generating is performed by a signal generating unit that includes a high-side metal-oxide-semiconductor field-effect-transistor (MOSFET) and a low-side MOSFET in each case for the at least one conductor, which are each connected to the at least one conductor so that the at least one electrical signal relayed by the at least one conductor to the load generates the at least one electrical output signal phase-shifted by 180° in relation thereto, and wherein, in order to generate the at least one electrical output signal, a low-side activation signal of the low-side MOSFET is phase-shifted by 180° in relation to the at least one electrical signal.

12. The method of claim 11, wherein the at least one electrical output signal is generated having an output signal amplitude equal to a signal amplitude of the associated at least one electrical signal.

13. The method of claim 11, wherein an electromagnetic interference field, which is emitted by at least one metallic surface of the load and/or an electronic component connected to the load or adjacent to the load, due to an excitation of the at least one metallic surface with the at least one electrical signal, is at least partially reduced or eliminated with the electromagnetic field emitted by the emitting structure.

14. The method of claim 12, wherein the emitting structure is excited to emit the electromagnetic field having a compensation intensity equal to an intensity of the electromagnetic interference field.

* * * * *